Aug. 12, 1924.
T. W. ROBBINS
1,504,978
LIQUID LEVEL INDICATOR
Filed March 22, 1921    2 Sheets-Sheet 1
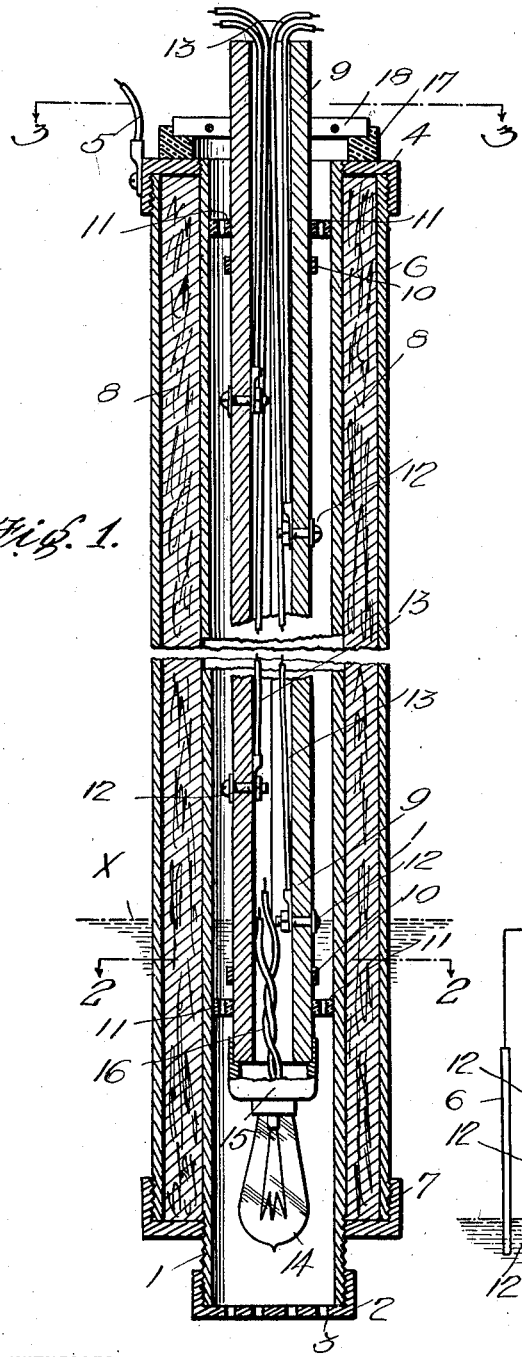
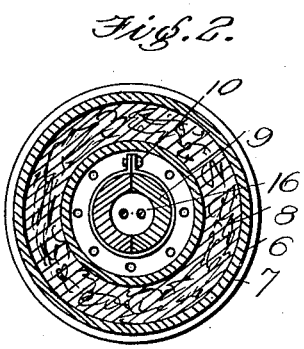
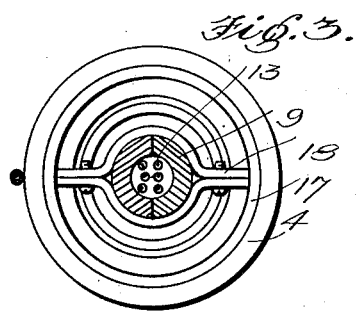
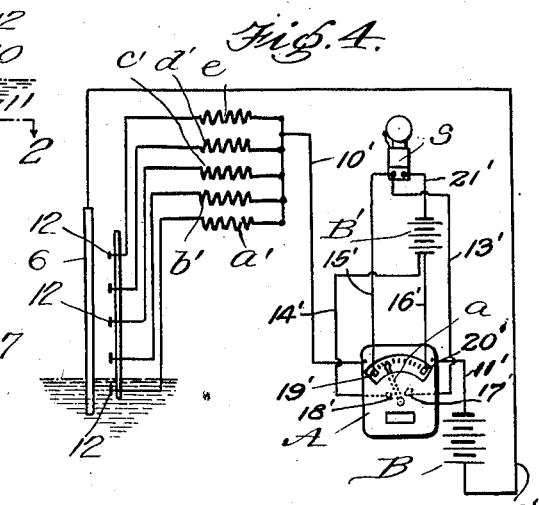
WITNESSES
H. Woodard
INVENTOR
Thomas W. Robbins
BY
ATTORNEYS Aug. 12, 1924.
T. W. ROBBINS
1,504,978
LIQUID LEVEL INDICATOR
Filed March 22, 1921    2 Sheets-Sheet 2
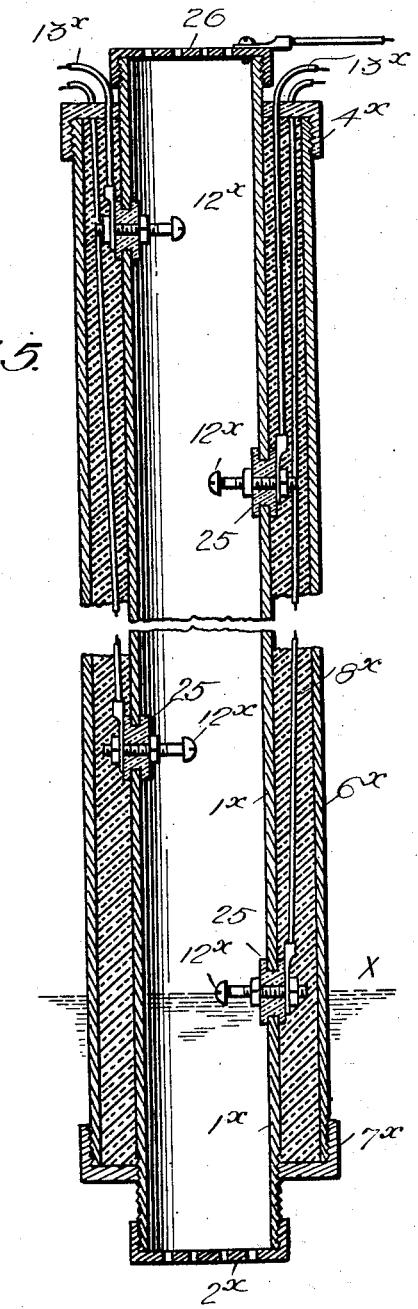
Fig. 5.
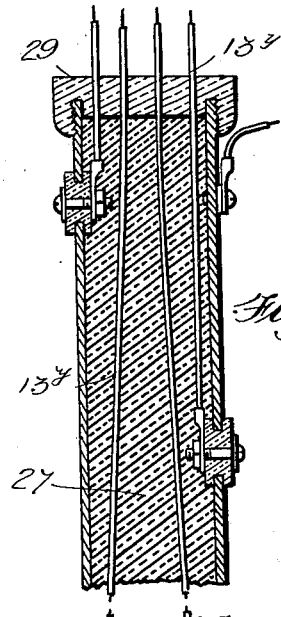
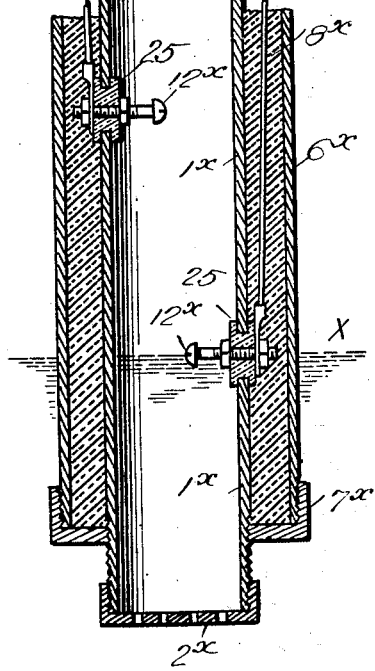
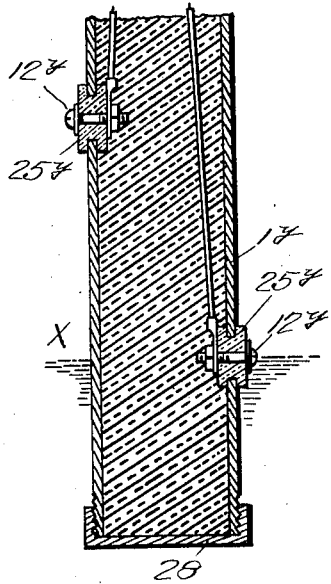
Fig. 6.
WITNESSES
INVENTOR
Thomas W. Robbins
BY
ATTORNEYS Patented Aug. 12, 1924.

1,504,978

UNITED STATES PATENT OFFICE.

THOMAS W. ROBBINS, OF BUTTE, MONTANA.

LIQUID-LEVEL INDICATOR.

Application filed March 22, 1921. Serial No. 454,537.

*To all whom it may concern:*

Be it known that I, THOMAS W. ROBBINS, a citizen of the United States, a resident of Butte, in the county of Silver Bow and State of Montana, have invented an Improvement in Liquid-Level Indicators, of which the following is a specification.

My invention relates to improvements in liquid level indicators, and it consists in the combinations, constructions and arrangements herein described and claimed.

An object of my invention is to provide a device by means of which the level of liquids in ponds, pumps, tanks or other containing vessel or structure may be readily ascertained.

A further object of my invention is to provide a means for ascertaining the level of a liquid which does not depend upon the use of a float, thus obviating the danger of inaccurate reading through the failure of the float to work.

A further object of my invention is to provide a device of the type described, which will positively indicate the depth of the liquid or the level of the surface of the liquid and which may also sound an alarm at a distance, thereby giving warning of the rise or fall of the liquid.

A further object of my invention is to provide a device which will give accurate readings in very cold water, means being provided for heating the water or other liquid, as explained hereinafter.

Other objects and advantages will appear in the following specification, and the novel features of the invention will be particularly pointed out in the appended claims.

My invention is illustrated in the accompanying drawings, forming a part of this application, in which—

Figure 1 is a sectional view through one form of liquid level indicator.

Figure 2 is a section on the line 2—2 of Figure 1.

Figure 3 is a section on the line 3—3 of Figure 1.

Figure 4 is a diagrammatic view of the circuit connections.

Figure 5 is a section through a modified form of the device.

Figure 6 is a section through another modified form of the device.

In carrying out my invention I may make use of a number of different forms, all of which, however, work on the same principle.

Referring now to Figure 1 I have shown therein a liquid level indicator which comprises an interior pipe 1 preferably of metal and having at its lower end a cap 2 which is perforated at 3 and which forms a strainer. At the upper end of the rod is a cap 4 to which a terminal 5 is attached. The cap 4 is threaded internally to receive an outer pipe or tube 6, the latter having at its end a cap 7. The space between the tubes 1 and 6 is preferably filled with heat insulating material 8, such as asbestos packing or the like.

Disposed on the interior of the pipe 1 is a conduit 9 which is preferably made of wood, being split in two along its central axis, and the two parts being held together by bands 10. At 11 I have shown perforated centering insulators which center the conduit 9 so as to leave a space between the exterior of the conduit and the interior of the tube 1.

At intervals along the conduit 9 are conducting members 12 which, in the present instance, are shown as screw bolts, these conducting members being each secured to an individual wire 13. The heads of these screw bolts 12 serve as contacts as will be explained later.

At the end of the conduit 9 is an incandescent lamp 14 whose base is contained in a liquid tight receptacle 15. Wires 16 lead to a suitable supply of current.

At the top of the device there is an insulating supporting ring 17 which supports an adjustable clamp 18. The space on the interior of the conduit 9 may be filled with insulating compound (not shown) if desired.

Referring now to Figure 4 it will be seen that each of the contacts 12 is connected with a resistance such as that shown at $a'$, $b'$, $c'$, etc., these resistances in turn being connected with an electrical measuring instrument such as an ammeter or a watt meter A through the wire 10'. A battery B is connected with the electrical measuring instrument A on its one side by the wire 11' and its other side is grounded through the wire 12' to the pipe or tube 6. The tube 6 is electrically connected to the tube 1 through the caps 4 and 7. An electric bell S is connected in a local circuit with a battery B', said local circuit comprising the wires 13', 14', 15', and 16'. The wire 13' connects one pole of the bell S with a contact point 17' carried by the instrument A, and the wire 14' connects one pole of the battery B with a similar contact 18' carried by the instrument A. Also the instrument A is provided with contacts 19' and 20', the contact 19' being connected to one pole of the bell S by a wire 15', while the contact 20' is connected to one pole of the battery B' by wire 16'. The other pole of the battery B' is connected through a wire 21' to the remaining side or polarity of the bell S', the wires 13' and 15' being both connected to the same pole of the bell S. The contacts 18' and 19' carried by the instrument A are so arranged that when the instrument hand $a$ moves to the left a sufficient degree, the two contacts will be electrically connected by said hand. The contacts 17' and 20' are also arranged that when the instrument hand $a$ moves to the right a sufficient degree, the said contacts are electrically connected.

From the foregoing description of the various parts of the device the operation thereof may be readily understood.

The device is in fact a pole which may be thrown into the liquid in the manner shown in Figure 1. In this figure it will be noted that the level of the liquid which is indicated at X is at the first contact 12. This contact as shown in Figure 4 is connected with a resistance $a'$ and hence current will flow from the battery B, through 6, through the liquid, through the conductor $a'$, and instrument A back to battery. If the resistance $a'$ is taken so as to permit a given amount of current, say one-half ampere, then the indicating end of the instrument A will move in accordance therewith. Now as the pole is thrust deeper into the liquid it will rise in the space between the inner conduit 9 and the pipe 1 and eventually reach the second contact 12. Additional current will now flow and the registering instrument A will be affected accordingly. One can readily ascertain the level of the liquid by looking at the instrument A. When the level of the liquid reaches a predetermined amount then the hand $a$ will cause the signal S to sound, thus giving a warning.

Obviously it may be necessary to use this device in very cold weather. The surface of the water within the instrument is in contact with the atmosphere and there is, therefore, danger of a skim of ice forming at this surface, which would prevent the water from rising in the space between the tubes 1 and 9. To guard against this contingency the lamp 14 is placed in the lower part of the tube 1 to act as a heater. This lamp gives off sufficient heat to raise the temperature of the small amount of water enclosed in the above freezing even in very cold weather, thus preventing ice from forming at its surface and permitting water within the instrument to rise and fall freely. The heat of the lamp is conserved by the heat insulation material 8 which surrounds the tube 1 for the greater portion of its length.

In Figure 5 I have shown a modified form of the device which is to be used primarily in liquids which are covered with a thick scum. In this instance the inner pipe $1^x$ is held from the outer pipe $6^x$ by means of the caps $4^x$ and $7^x$, respectively, the space between being filled with insulating compound $8^x$. In this instance the contacts $12^x$ extend into the interior of the pipe $1^x$, being connected by the conductors $13^x$ with their respective resistances (not shown). These contacts 12 are insulated by the porcelain insulators 25. Any other suitable insulating material may be used. At the lower end of the pipe $1^x$ is a strainer $2^x$ and on the upper end is a perforated cover 26.

In this instance, as in the other, when the water reaches the contacts $12^x$ a circuit is formed which causes the hand of the instrument to move.

In Figure 6 I have shown a third form of the device which is designed primarily for clear liquids. In this instance the pipe $1^y$ is provided with contacts $12^y$ which are held in insulating bushings $25^y$. Each contact is connected by a conductor $13^y$. The interior of the pipe is preferably filled with insulating compound 27, and the ends of the pipe are closed by the caps 28 and 29, respectively.

In each of these forms the conducting liquid forms part of the circuit. The device is especially adapted for use in places where one cannot see the level of the liquid, as for instance the level of water in wells, tanks or sumps, or in the holds of vessels. Since the ascertaining of the level of the liquid does not depend on a float the device is not liable to error which may be occasioned when the float sticks.

I claim:

1. A liquid level indicator, comprising in combination, a pair of tubular members, one disposed within the other, heat insulating material interposed between said tubular members, metallic means for connecting together the similar ends of said tubular members, a third tubular member within the innermost tubular member and said third tubular member being made of insulating material and having its lower end in spaced relation with the lower end of the first named tubular members, a plurality of contacts arranged within the third tubular member longitudinally thereof, an electric light supported at the lower end of the third tubular member, means whereby the light may be connected to a source of electric current supply, and means connected with the contacts whereby upon the device being submerged into a liquid the moment will be indicated when each of the insulated contacts become submerged in said liquid.

2. In a liquid level indicating apparatus, an elongated member adapted to be lowered into a liquid, electrical contact members arranged upon said member longitudinally thereof, means whereby an enclosure may be formed about the contact carrying member with restricted openings for admitting the liquid, a heating element disposed in said enclosure, and electrical circuits and indicating devices connected with said contact members whereby the height of liquid within the enclosure may be indicated at a remote point.

3. In a liquid level indicating apparatus, an elongated hollow member, a plurality of insulated contacts carried by said member and arranged longitudinally thereof, a casing adapted to enclose said elongated member and said casing being adapted to be lowered into a body of liquid and having restricted openings through which the liquid may enter into said casing and about said elongated contact carrying member, electrical circuits and indicating devices connected to said contact members adapted to indicate at a remote point the height of the liquid within said casing, and a heating element carried upon the lower end of the elongated contact carrier member for the purpose described.

4. In a liquid level indicating apparatus, an elongated hollow member, a plurality of insulated contacts carried by said member and arranged longitudinally thereof, a casing adapted to enclose said elongated member and said casing being adapted to be lowered into a body of liquid and having restricted openings through which the liquid may enter into said casing and about said elongated contact carrying member, electrical circuits and indicating devices connected to said contact members adapted to indicate at a remote point the height of the liquid within said casing, and an incandescent lamp fixed upon the lower end of the elongated contact carrying member for the purpose described.

THOMAS W. ROBBINS.